Patented Aug. 23, 1932

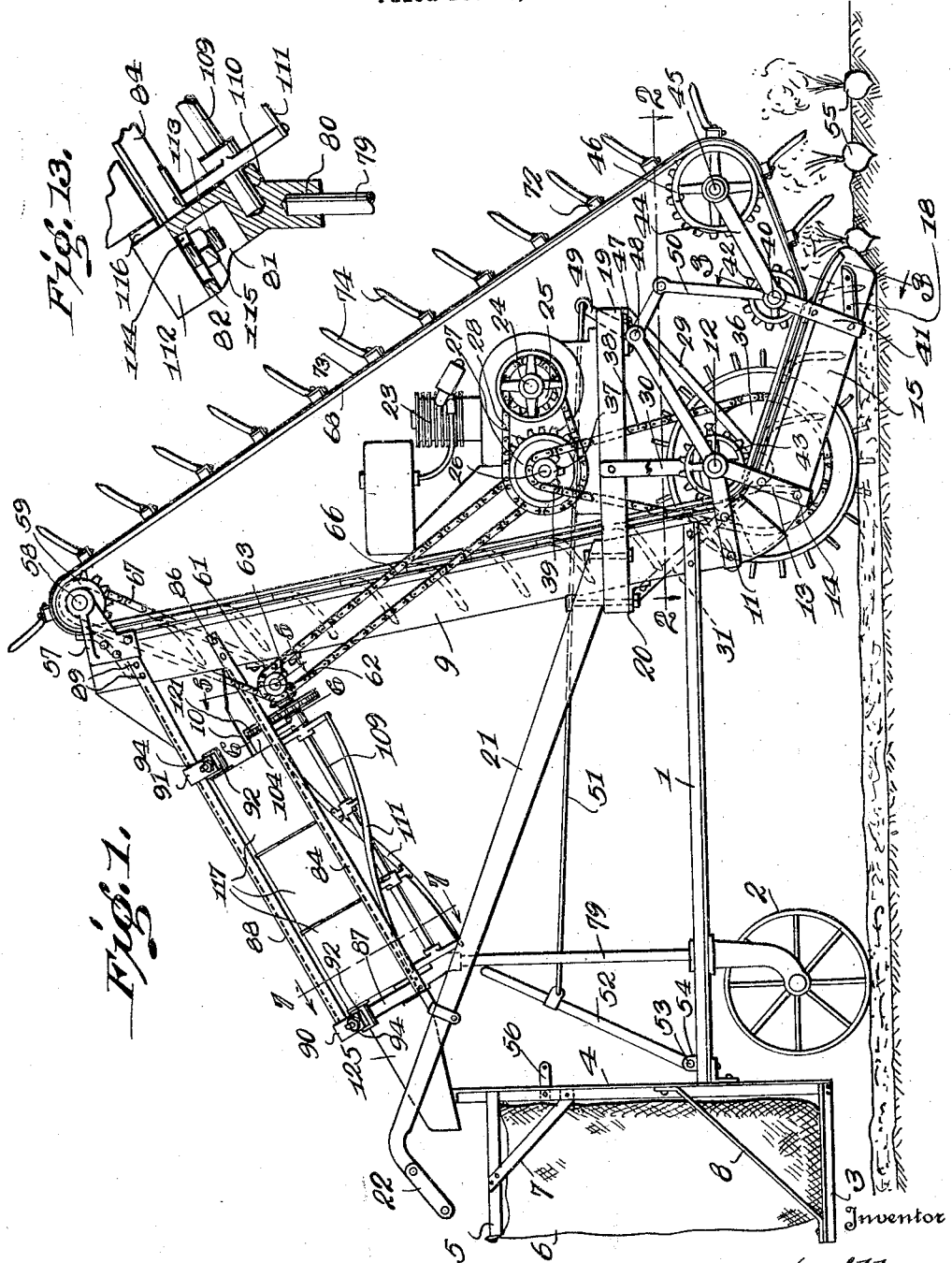

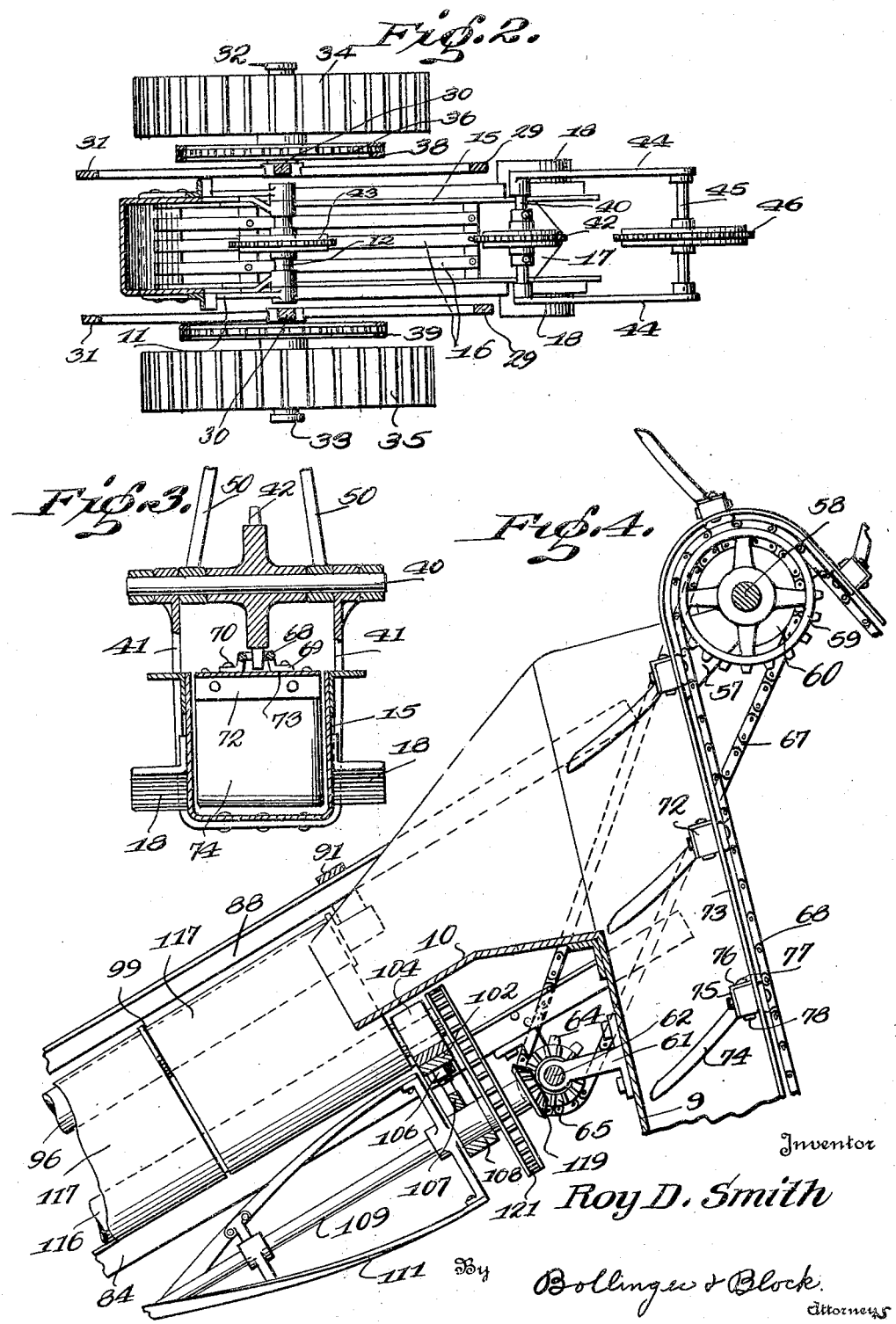

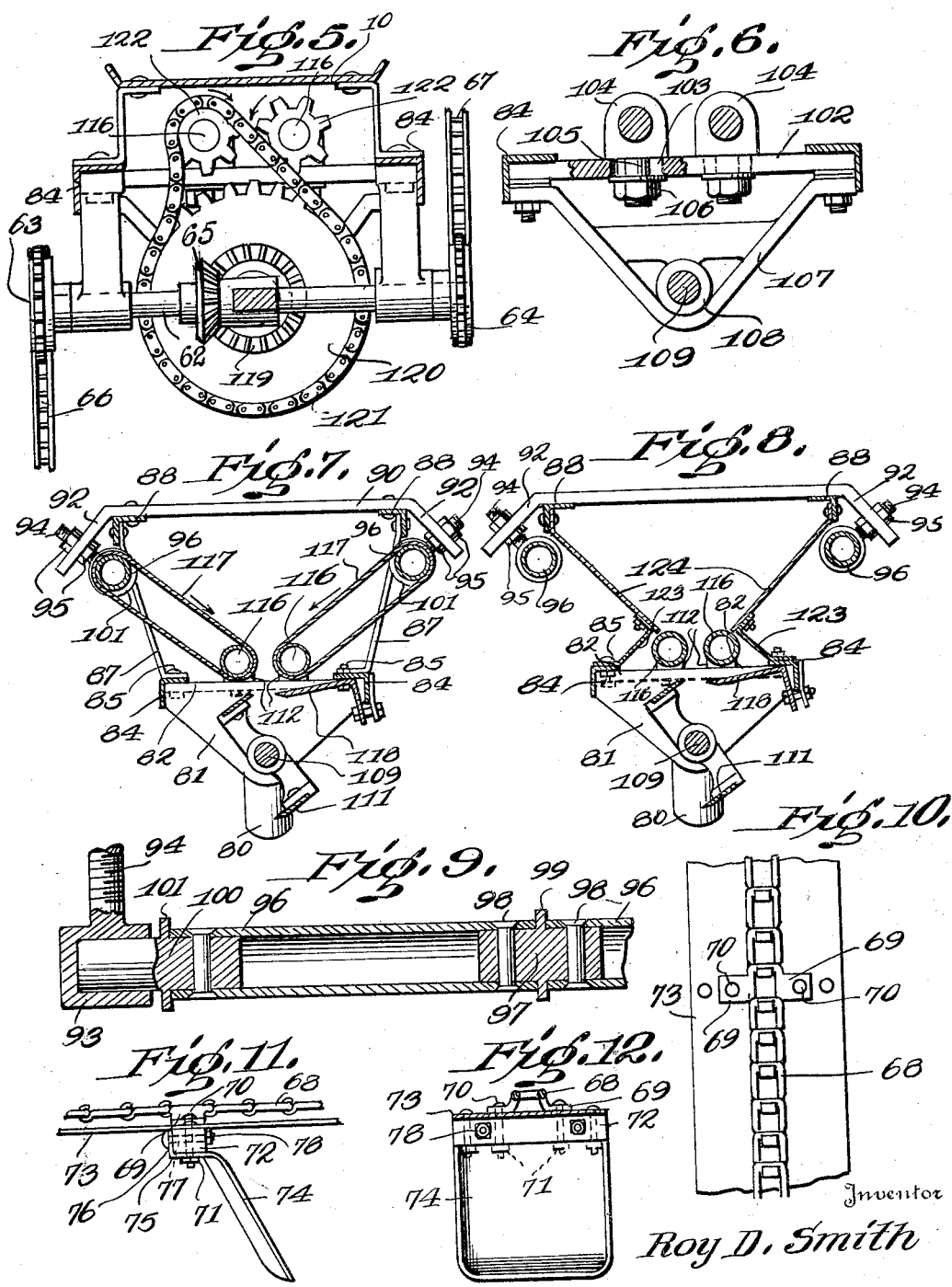

1,873,352

UNITED STATES PATENT OFFICE

ROY D. SMITH, OF PLEASANT VALLEY, IOWA

VEGETABLE HARVESTER

Application filed December 6, 1929. Serial No. 412,117.

My invention relates to new and useful improvements in vegetable harvesters and has for its principal object the provision of a device of this character which may be propelled over the ground and provided with means for extracting the vegetables from the soil, means for topping the vegetables, means for conveying the vegetables from the extracting means to the topping means, and means for delivering the vegetables after being topped into a suitable receptacle.

Another object of the invention resides in the formation of the extracting means in such a manner that it may be raised and lowered at the will of the operator, means also being provided whereby the extracting means is limited as to the depth to which it will extend into the ground.

A further object of the invention resides in the provision of a novel form of topping mechanism including a hopper into which the vegetables are deposited and a cutter positioned relative to the hopper to engage and cut the tops from the vegetables, the hopper including means for properly positioning the tops of the vegetables so that they will be engaged by the cutter.

A still further object of the invention resides in the provision of a novel form of conveyor including a plurality of blades which extract the vegetables from the soil and then carry them to a position for discharge to the topping mechanism, the blades being secured to a chain and means being provided on the chain to prevent the tops of the vegetables from becoming entangled in the chain or sprocket wheels over which the chain passes.

Still another object of the invention resides in so mounting the various mechanisms so that the same may be moved over the ground as a unitary structure and the operator will be in such a position that he may view the vegetables being discharged into the receptacle and if any of the same are not properly topped he may remove them prior to discharge into the receptacle and return them to the topping mechanism.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a side elevation of the completed or assembled machine.

Fig. 2 is a horizontal section on the line 2—2 of Fig. 1 looking in the direction of the arrows.

Fig. 3 is a substantial vertical section on the line 3—3 of Fig. 1 looking in the direction of the arrows.

Fig. 4 is a fragmental detail showing a vertical section with parts in side elevation at the point where the vegetables are delivered from the conveyor or elevator to the topping mechanism.

Fig. 5 is a section on the line 5—5 of Fig. 1 looking in the direction of the arrows.

Fig. 6 is a section on the line 6—6 of Fig. 1.

Fig. 7 is a section on the line 7—7 of Fig. 1.

Fig. 8 is a view similar to Fig. 7 showing a slightly modified form of hopper construction for the topping mechanism.

Fig. 9 is a detail showing a longitudinal section, with parts in elevation, of one of the rollers used in the topping hopper.

Figs. 10, 11 and 12 are details of the elevating conveyor; and

Fig. 13 is a fragmental detail with parts in vertical section and parts in elevation of the casting forming a bearing for the topper and rollers positioned in the topping hopper.

In the drawings 1 indicates a supporting frame, preferably of angle iron construction, supported adjacent the rear end by the wheel 2 and at the forward end by tractor wheels to be later described. A platform 3 is secured to and supported by the rear end of the frame 1 and has the upwardly extending back portion 4 provided adjacent the upper end with the rearwardly extending ring 5 to which the upper edge of a bag 6 or other suitable receptacle may be connected, the lower end of the bag or receptacle being supported on the platform 3. Braces 7 are connected to and extend between the back portion 4 and ring 5 and braces 8 are secured to the back portion 4 and platform 3. Secured to and supported by the forward end of the frame 1 is a chute or guideway 9 through which the vegetables are elevated to be discharged into the spout 10 of the construction more particularly illustrated in Fig. 4 of the drawings. Secured adjacent the lower end of the chute or guideway 9 are brackets 11 which support the shaft 12 and mounted on the shaft 12 are the depending links or strips 13 to which are secured, by means of the rivets, bolts or other suitable fastenings, a member 15 which has its upper end telescoping within the lower end of the chute 9 and forming a continuation of said chute. The bottom of the member 15 is formed of longitudinally extending transversely spaced slats 16 to the forward end of which is secured a blade 17 which will enter the ground and dig the vegetables therefrom. This blade is preferably of the shape shown more particularly in Fig. 2 of the drawings and will enter the ground as shown in Fig. 1. The slats being spaced apart will allow the dirt gathered with the vegetables to drop therethrough to prevent clogging but at the same time the slats are sufficiently close together to support the vegetables and to allow the same to be carried thereover by the elevating means to be later described. At 18 I have shown gauges to limit the depth at which the blade 17 will enter the ground, the gauges riding over the surface of the ground as shown more particularly in Fig. 1 of the drawings.

A platform 19 is secured to the chute 9 by means of the brackets 20 and extending rearwardly from the platform are the handles 21 having the hand grips 22 positioned adjacent the top of the bag or receptacle 6. Supported upon the platform 19 is an internal combustion engine 23 or other suitable motor which drives the shaft 24 to which is secured the gear wheel 25. Also rotatably mounted in the engine casting is a transversely extending horizontal shaft 26 to which is secured a sprocket wheel 27. A sprocket chain 28 operates around the sprocket wheels 25 and 27 and thereby the shaft 26 is driven from the shaft 24.

Depending from the platform 19, adjacent each side edge thereof, are the arms 29, 30 and 31 which come together at their lower ends and support the outwardly extending stub axles 32 and 33 on opposite sides of the extension 15 of the chute 9 and mounted, respectively, on these stub axles 32 and 33 are the traction wheels 34 and 35. These traction wheels are the ones, previously referred to, which support the forward end of the machine. Secured to each of the traction wheels 34 and 35 is a sprocket wheel 36 and carried by the horizontal shaft 26, adjacent each end thereof, is a sprocket wheel 37, these sprocket wheels 37 being in alignment with the sprocket wheels 36. A sprocket chain 38 is extended around one of the sprocket wheels 37 and one of the sprocket wheels 36 and a similar sprocket chain 39 is extended around the other sprocket wheel 37 and aligned sprocket wheel 36, the sprocket chain 38 thereby driving the traction wheel 34 while the sprocket chain 39 drives the traction wheel 35. It will thus be seen that through means of the shaft 26, which is driven from the motor, the traction wheels are operated through means of the sprocket chains 38 and 39. When the traction wheels are operated they will propel the machine over the ground.

A shaft 40 is connected to and supported from the forward end of the adjustable extension 15 of the chute 9 by means of the strips or plates 41 and secured to the shaft 40 is a sprocket wheel 42 which aligns with a sprocket wheel 43 mounted on the shaft 12. Extending forwardly and upwardly from the shaft 40 are the links 44 in the outer ends of which is mounted a shaft 45 which carries the sprocket wheel 46. This sprocket wheel 46 aligns with the sprocket wheels 42 and 43, as shown more particularly in Fig. 2 of the drawings. Brackets 47 are secured to the under side of the platform 19, adjacent the forward edge thereof, and support the horizontal shaft 48 to which is connected, for swinging movement, the bell crank lever 49. Connected to the lower arm of the bell crank lever is a link 50 which has its lower end connected to the shaft 40. Connected to the upper arm of the bell crank lever is a rod 51 which extends towards the rear end of the machine with its end connected to the lever 52 pivotally connected at 53 to the bracket 54 carried by the frame 1. In Fig. 1 of the drawings I have shown the lever 52 positioned forwardly with the lower end or extension 15 of the chute in position to gather the vegetables which I have indicated generally at 55. When the lever is pulled rearwardly it will in turn draw upon the rod 51 and through means of the bell crank lever 49 and link 50 raise the forward end or extension of the chute out of the ground so that the machine may be propelled without digging or harvesting the vegetables. At 56 I have shown a spring clip, secured to the back portion 4 of the platform 3 and positioned to engage the lever when in its rearwardmost position and hold the same in that position with the forward end or extension of the chute in its raised position.

Secured to the sides of the chute 9, at the upper end thereof, are the brackets 57 which support the horizontal shaft 58 to which the sprocket wheels 59 and 60 are secured, the sprocket wheel 59 being in alignment with the sprocket wheels 42, 43 and 46. Secured to the rear face of the chute 9, adjacent the upper end thereof, are the brackets 61 which support the horizontal shaft 62 to which are secured the sprocket wheels 63 and 64 and the beveled gear 65. A sprocket chain 66, driven from the shaft 26, operates around the sprocket wheel 63 and drives the shaft 62. A sprocket chain 67 operates around the sprocket wheels 60 and 64 and drives the shaft 58.

A conveyor chain 68 is trained and operates around the sprocket wheels 42, 43, 46 and 59, as shown more particularly in Fig. 1 of the drawings and formed as a part of certain of the links of the chain are the projections 69 to which are secured, by means of the bolts 70 and nuts 71 the transversely extending wooden blocks 72. Positioned between the inner faces of the wooden blocks 72 and the adjacent faces of the extensions 69 is a canvas strip 73 which extends parallel beneath the chain and acts to prevent dirt or the vegetables from engaging and clogging the chain. This allows ready operation of the conveyor chain around the several sprockets. It will be understood that the conveyor chain is driven from the sprocket wheel 59 carried by the shaft 58. Blades 74 are secured to the transversely extending blocks 72 by means of the bolts 70 and nuts 71, the bolts extending through horizontal extensions 75 at the top of the blades which extend parallel with the outer faces of the blocks 72. The ends of the horizontal portions 75, of the blades, are bent upwardly to form the vertical extensions 76, extending parallel with a vertical face of the associated block 72. Transversely extending bolts 77 pass through the vertical extensions 76 and through the blocks 72 and receive the nuts 78. The blades 74 extend at an angle from the blocks 72, as quite clearly illustrated in the drawings and after the vegetables have been dug from the ground by the blade 17 they will enter the extension 15 of the chute and be conveyed upwardly through the extension and chute by means of the blades, it being understood that the blades enter the chute, as quite clearly illustrated in the drawings. Upon reaching the upper end of the chute the vegetables are deposited onto the spout 10 from which they are discharged to a hopper to be later described.

Supported by and extending upwardly from the frame 1 is a standard 79 which has its upper end received in the socket 80 of the casting 81. This casting has at the top the outwardly flared portions 82 the ends of which are adapted to be engaged by the upper arms of angle iron strips 84 which are secured to the flared portion of the casting by means of the rivets, bolts or other suitable fastenings 85. The strips 84 extend upwardly at an angle towards the chute 9 and the upper ends thereof are secured to the side faces of the chute by means of rivets or other suitable fastenings 86. Secured to the strips 84, at their lower or rear ends, and extending upwardly therefrom are the plates or brackets 87 to the upper ends of which are secured the angle iron strips 88 similar to the strips 84. The strips 88 extend towards the forward end of the machine and upwardly at an angle with their upper ends secured to the sides of the chute 9 by means of the rivets 89 or other suitable fastenings. Secured to and extending transversely over the tops of the strips 88 are the plates or strips 90 and 91 which are longitudinally spaced, as shown more particularly in Fig. 1 of the drawings and the ends of these plates or strips are bent downwardly as shown more particularly at 92 in Fig. 7 of the drawings. Carried by each of the downwardly inclined extensions 92 is a socket member 93 having the threaded shank portion 94 which passes through the extensions 92 and receives the nuts 95. Supported by the socket members 93 are the rollers of the construction shown more particularly in Fig. 9 of the drawings. Each of these rollers consists of a plurality of hollow sections 96, adjacent ends of which are secured together by means of a member 97 having its ends received in the sections and secured thereby by means of rivets 98 or other suitable fastenings. Each of the members 97 has a flange 99 extending between the ends of the sections 96 and beyond the periphery thereof for a purpose to be later described. Received in the outer ends of the end sections 96 are the shafts 100, the ends of which are received in the socket members 93 as shown. Each of the shafts 100 has an outwardly directed flange 101 extending beyond the periphery of the section of the roller and cooperating with the flanges 99 of the members 97 in a manner to be later described.

Secured to and extending between the strips 84, adjacent the upper ends thereof, is a plate 102 having the spaced elongated openings 103, as shown more particularly in Fig. 6 of the drawings. Mounted on the upper surface of this plate 102 are the socket members or bearings 104 having the depending threaded portions 105 which extend through the openings 103 and receive the nuts 106. Secured to and depending from the strips 84 and plate 102 is the bracket member 107 having a bearing portion 108 to receive one end of a shaft 109, the opposite end of the shaft being received in the recess 110 formed in the inner face of the casting 81 supported by the standard 79. Carried by the shaft 109 are the cutting blades 111 of the shape shown more particularly in Figs. 1 and 4 of the drawings and adapted to operate in a manner to be later described for removing or cutting tops from the gathered vegetables.

Supported on the upper face of the casting 81 are the socket or bearing members 112 similar to the members or bearings 104, these bearings or socket members being readily adjustable transversely of the casting in the same manner that the bearings or socket members 104 are adjustable, they having threaded extensions 113 which pass through elongated openings 114 and receive the nuts 115. Extending between and supported by the socket members or bearings 104 and 112 are the rollers 116, as shown more particularly in Figs. 7 and 8 of the drawings. As shown more particularly in Figs. 7 and 8 the rollers 116 are transversely spaced to allow the tops of the vegetables to pass therethrough and to be engaged by the blades 111. Operating around each of the rollers 116 and extending upwardly and operating around the rollers formed in the sections 96 are the belts 117 which as shown, more particularly in Fig. 7 of the drawings, form a hopper to receive the vegetables from the spout 10. The belt sections 117 operate between the flanges 99 and 101 forming a part of the upper rollers. Secured to one of the angle iron strips 84 and extending inwardly to a point adjacent the space formed between the rollers 116 is a blade 118 which cooperates with the blades 111 carried by the rotatable shaft 109 to top the vegetables. Secured to the upper or forward end of the shaft 109 is a beveled gear 119 which meshes with the beveled gear 65 on the shaft 62. Through means of the meshing of these beveled gears the shaft 109 is rotated. Also secured to the shaft 109 is a relatively large sprocket wheel 120 around which operates a sprocket chain 121. Secured to the upper end of each of the rollers 116 is a sprocket wheel 122 and the chain 121 will engage these sprocket wheels 122, as shown more particularly in Fig. 5 of the drawings to operate them in the directions indicated by the arrows. Through means of the chain and sprocket wheels the rollers 116 are rotated to operate the belts 117 in the direction indicated in Fig. 7 of the drawings to feed the vegetables towards the bottom of the hopper or in a position so that their tops will pass through the space between the rollers 116 to be cut off by the rotating blades 111 cooperating with the blade 118.

In Fig. 8 of the drawings I have shown a somewhat different form of hopper, for receiving the vegetables, from that illustrated in Fig. 7 of the drawings. Instead of providing the movable belts for feeding the vegetables towards the bottom of the hopper I provide inclined plates. In this form of the invention the brackets 123 are secured to the side strips 84 instead of the strips or plates 87 shown in Fig. 7 and secured to these brackets 123 and to the upper side strips 88 are the plates 124 which are arranged at such an angle as to direct the vegetables towards the rollers 116 so that the tops thereof may pass through the space between the rollers to be cut off by the knives or blades 111 cooperating with the blade 118. In all other respects the construction shown in Fig. 8 is the same as that disclosed in Fig. 7. In fact what I do is to provide the interchangeable plates and belts and either the belts or plates may be used as may be found desirable.

At the lower end of the hopper I provide the spout 125 which extends over the upper edge of the back 4 of the platform 3, as shown more particularly in Fig. 1 of the drawings, and discharges the vegetables from which the tops have been cut into the bag or other receptacle 6. It will be understood that the tops drop from the hopper, onto the ground, after being cut from the vegetables.

From the above detail description it is thought that the construction and manner of operation will be clearly understood. It will be seen that the machine will be propelled over the ground by the motor mounted on the platform 19 and with the lower end or extension 15 of the chute lowered as shown more particularly in Fig. 1 of the drawings the blade 17 at the bottom of the extension will cut into the ground and dig the vegetables shown generally at 55. The vegetables will pass into the extension 15 and through means of the blades 74 on the conveyor chain 68 will be raised through the chute and deposited into the spout 10 from which they are discharged into the hopper member illustrated more particularly in Figs. 7 and 8 of the drawings. Most of the dirt gathered with the vegetables will pass between the slate 16 forming the bottom of the extension 15 but if dirt remains as the vegetables are carried up through the chute it will have a tendency to drop back to the bottom of the chute and be discharged. After the vegetables are discharged into the hopper they will be directed towards the bottom thereof by either the belts 117, shown in Fig. 7 or the inclined plates 124, shown in Fig. 8. When the belts are used they naturally draw the vegetables towards the bottom and direct the tops thereof through the space between the rollers 116. If the plates 124 are used instead of the belts the vegetables are directed to the rollers 116 which draw the tops through the space in position to be cut off by the rotating blades or knives 111 cooperating with the blade 118. The tops, as previously described, will drop through the bottom of the hopper onto the ground. The vegetables, after being topped, pass into the spout 125 from which they are discharged into the bag or receptacle 6. I wish to lay particular advantage on the idea of having the operator working at a point where he can examine the vegetables just prior to the time in which they are discharged into the bag or receptacle. The operator will walk behind the machine and guide the same by grasping the hand grips 22 on the handles 21. He will be in a position to observe the vegetables as they are discharged into the spout 125 from the hopper and if they are not properly topped be may remove the same by hand and return them to the hopper to be further acted upon. When the machine is to be no longer used the operator may raise the extension 15 of the chute, with the lower end of the conveyor chain and blades, by grasping the lever 52 and pulling the same rearwardly. When pulling on the lever the rod 51 will act on the bell crank lever 49 and through means of the link 50 raise the extension or lower end of the chute 15. When thus raised the machine may be moved over the ground without digging. When the lever 52 is swung to its rearwardmost position to hold the extension 15 raised it will be engaged by the spring clip 56 and held against accidental displacement. It will be further noted that I have provided means whereby the rollers 116 at the bottom of the hopper may be adjusted transversely to provide the desired space therebetween to allow the tops of different vegetables to pass properly therethrough.

Having fully described my invention what I claim as new and desire to secure by Letters Patent is:

1. A harvester of the character described including means for removing vegetables from the ground, a conveyor for raising the removed vegetables, and a hopper into which the vegetables are deposited by the conveyor, said conveyor including a chain, a plurality of blades, and means interposed between the chain and blades for preventing clogging of the chain.

2. A harvester of the character described including means for removing vegetables from the ground, a conveyor for raising the removed vegetables, and a hopper into which the vegetables are deposited by the conveyor, said conveyor including a chain, a plurality of blades, and means interposed between the chain and blades and extending parallel with the chain for preventing clogging of the chain.

3. A harvester of the character described including a chute having a movable lower portion for removing the vegetables from the ground, a conveyor for carrying the removed vegetables through the chute, a portion of said conveyor being connected to and operable with the movable portion of the chute, a hopper into which the vegetables are deposited from the conveyor, and means for raising and lowering the movable portion of the chute and the associated part of the conveyor.

4. A harvester of the character described including a chute having a movable lower portion for removing the vegetables from the ground, a conveyor for carrying the removed vegetables through the chute, a portion of said conveyor being connected to and operable with the movable portion of the chute, a hopper into which the vegetables are deposited from the conveyor, means for removing the tops of the vegetables while in the hopper, a receptacle into which the topped vegetables are deposited, and means for raising and lowering the movable portion of the chute and the associated part of the conveyor.

5. A harvester of the character described including a frame, supporting means for the frame including a traction wheel, a platform secured to the frame, means mounted on the platform for driving the traction wheel for propelling the harvester, a chute carried by the frame and having an adjustable lower portion for removing vegetables from the ground, a conveyor for carrying the removed vegetables through the chute, and means for operating the adjustable lower portion of the chute.

6. A harvester of the character described including a frame, supporting means for the frame including a traction wheel, a chute carried by the frame and having an adjustable lower portion for removing vegetables from the ground, a conveyor for carrying the removed vegetables through the chute, a hopper into which the vegetables are discharged from the chute, rollers positioned in the bottom of the hopper with a space therebetween, a cutter positioned beneath the rollers for removing the tops from the vegetables as they are drawn through the space between the rollers upon operation thereof, a platform, means mounted on the platform for driving the traction wheel to propel the harvester, to operate the conveyor, to operate the rollers positioned in the bottom of the hopper and to operate the cutter, and means for operating the adjustable lower portion of the chute.

In testimony whereof I hereunto affix my signature.

ROY D. SMITH.